United States Patent [19]

Fennelly

[11] 3,744,254

[45] July 10, 1973

[54] PROCESS AND APPARATUS FOR CONTAINMENT OF AQUEOUS POLLUTANTS

[76] Inventor: Richard P. Fennelly, 33-23 147th St., Flushing, N.Y. 11354

[22] Filed: May 17, 1972

[21] Appl. No.: 253,981

[52] U.S. Cl............................ 61/1, 61/6, 210/170, 210/242
[51] Int. Cl............................................. E02b 15/04
[58] Field of Search ..................... 61/1, 6; 210/170, 210/242, DIG. 21

[56] References Cited
UNITED STATES PATENTS

| | | | |
|---|---|---|---|
| 3,469,402 | 9/1969 | Lowd........................................ 61/1 |
| 3,491,023 | 1/1970 | McCormick..................... 210/242 X |
| 3,593,526 | 7/1971 | Hoult........................................ 61/1 |
| 3,599,434 | 8/1971 | Missud..................................... 61/1 |
| 3,651,646 | 2/1972 | Grunau.................................... 61/1 |
| 3,667,235 | 6/1972 | Preus et al..................... 210/242 X |

Primary Examiner—Samih N. Zaharna
Assistant Examiner—Ivars Cintins
Attorney—Granville M. Brumbaugh et al.

[57] ABSTRACT

An air or bubble barrier which can be used to contain and deflect aqueous pollutants, such as oil, flotsam and the like, is confined within its desired line of travel by placing a mesh material between at least one point adjacent the generation point of the gas below the surface of the water and a point which is adjacent the surface of the water. The mesh material can be ordinary wire screening used in household screens. The use of the mesh material insures that the bubble barrier will follow a desired line of travel largely unaffected by currents or eddies which would normally disperse the bubble stream to an undesirable extent.

9 Claims, 3 Drawing Figures

PROCESS AND APPARATUS FOR CONTAINMENT OF AQUEOUS POLLUTANTS

It has been recently suggested that aqueous pollutants, such as oil, flotsam and the like, can be contained in a desired area by the generation of an air or bubble barrier from a conduit located at a point below the surface of the water to thereby form a bubble barrier which will rise to the surface of the water to contain pollutants within a preselected area. An example of such a process is described in McCormick U.S. Pat. No. 3,491,023, which issued on Jan. 20, 1970. Although such a process works well in an aqueous environment which does not contain strong currents or eddies, it has been found that presence of such disturbances will disperse the bubble barrier to an unacceptable degree and thereby preclude formation at the surface of the water of the desired interlocking zone of turbulence which is responsible for holding the pollutants in the preselected area.

The present invention is specifically designed to be an improved version of the conventional bubble barrier apparatus and process and is specifically directed to placing one end of a mesh material, such as ordinary window screening, at a point adjacent the generation point of the gas and placing the other end of the mesh material at a point adjacent the surface of the water to thereby form a wall of mesh material which will contain the bubbles in a desired line of travel between the bubble generation point and the surface of the water.

The invention is further understood by referring to the figures which are appended herewith and which form a portion of the specification wherein.

Figure 1:
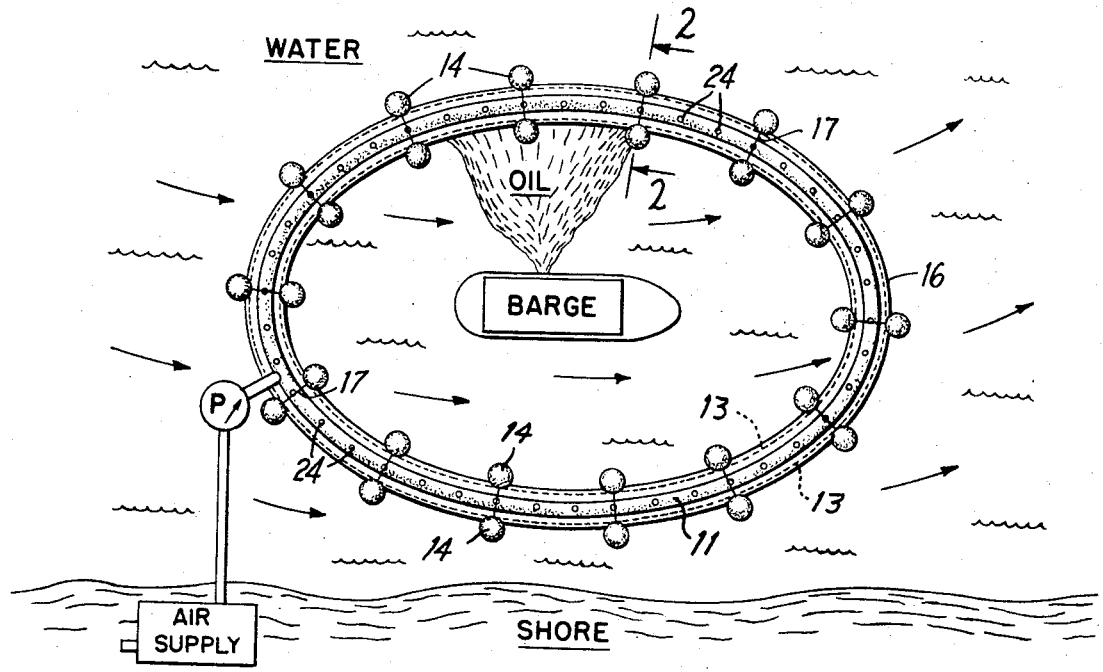
FIG. 1 is an overhead view showing the apparatus of the present invention in position to contain an oil slick that has leaked from a barge in an aqueous environment containing rather strong currents which are indicated by arrows.

FIG. 1 shows the apparatus of the present invention in position to contai an oil slick which has leaked from a barge at some distance from the shore. In order to contain it within a preselected area, the gas supplying conduit 11, contain example the one described in U.S. Pat. No. 3,491,023, is located at some point below the surface of the water in a position to cause generation of a bubble barrier which will rise to the surface of the water to form a zone of interlocking turbulence at the surface. The shape of the conduit system will depend in large part upon the environment in which the spill occurs. In FIG. 1 it is depicted as surrounding a barge. However, it is to be understood that this arrangement is merely one which can be used depending upon the applicable circumstances.

Figure 2:
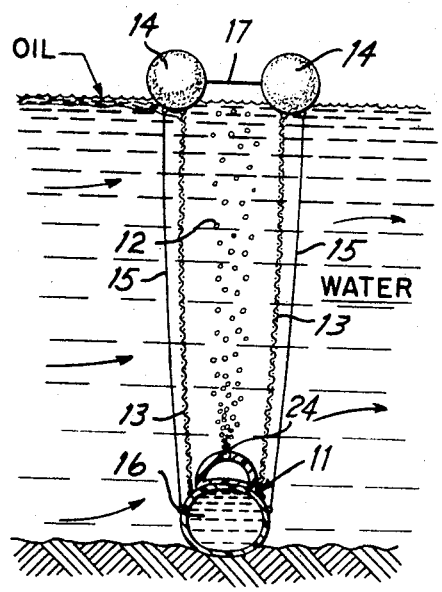
FIG. 2 is a sectional view showing an embodiment of the invention using the apparatus of the present invention in an aqueous environment containing a variety of currents and eddies.

The bubble barrier 12 will normally rise in still water to cause the desired containment. However, if the environment has either currents or eddies in various directions as shown in FIG. 2, or a steady uni-directional current as shown in FIG. 3, the mere use of a bubble barrier will not generally suffice since the presence of the currents or eddies will disperse the bubbles and thereby prevent the desired degree of surface turbulence due to dispersion of the bubbles as they rise to the surface of the water.

In order to contain the bubble barrier in a desired line of travel in aqueous environments containing currents or eddies, the invention contemplates providing a mesh material 13 to confine the bubble as they rise within a desired line of travel. In FIG. 2, in which the currents and eddies are in a variety of directions, it is necessary to apply the mesh material 13 on both sides of the outlet 24 in conduit 11 from which the bubbles are generated. The upward travel of the bubbles insures that they will strike the mesh material or screening at an angle which is not substantially normal to the plane in which it lies at the point of impact thereby insuring that the bubbles will not pass through the openings in the mesh material but will rather rebound and remain within the corridor formed by the two portions of mesh material. Each mesh material can be attached at one of its ends to the conduit 11 so that it is adjacent the point of gas generation. Its other end is placed adjacent the surface of the water, preferably by attachment to a float 14. Guy wires 15 or restraining members link the floats 14 with the ballast member 16 attached to the gas conduit 11 to insure that the position of the floats will not vary too much from the position occupied by the gas generation means. If desired, the position of the floats relative to one another can be stabilized by including another guy wire 17 as a restraining member.

Figure 3:
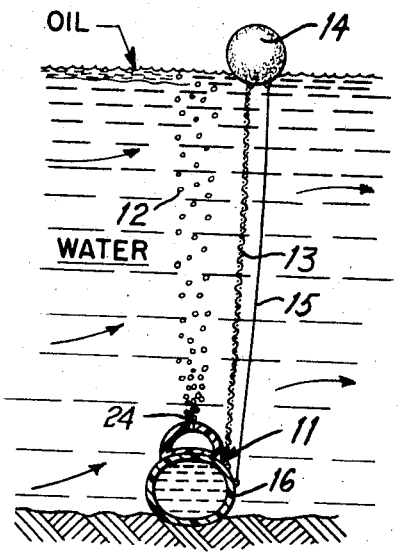
FIG. 3 is another embodiment of the invention utilizing the apparatus of the present invention in an aqueous environment containing a rather steady unidirectional current.

FIG. 3 shows another embodiment of the invention which is useful in environments in which the current is generally in one direction. Only one piece of mesh material 13 is needed. The presence of the current will insure that the bubbles in their rebounding travel towards the surface will be held in very close proximity to the mesh material.

By using the apparatus and process of the present invention, the person can contain an aqueous pollutant within a desired area merely by pumping air or bubbles underneath the surface of the water to form a desired bubble barrier. This can be done even if currents or eddies of rather strong force are present since the mesh material will contain the bubble barrier within a desired line of travel and thereby insure the desired interlocking surface band of turbulence and coherent bubble barrier between the point of generation and the surface.

I claim:

1. In a process for the containment of aqueous pollutants by generation of gas from a gas supplying conduit located at a point below the surface of the water to form a bubble barrier which rises to the surface of the water to thereby contain the pollutants within a preselected area wherein the improvement comprises placing a mesh material between at least one point adjacent the generation point of the gas and a point adjacent the surface of the water to contain the bubbles in a desired line of travel between the bubble generation point and the surface of the water.

2. A process as claimed in claim 1 wherein the mesh material which is placed adjacent the point of generation of the gas is wire screening.

3. A process as claimed in claim 1 wherein the end of the mesh material which is adjacent the surface of the water is attached to a float.

4. A process as claimed in claim 1 wherein two separate portions of mesh material are used, one end of each being attached to two separate points adjacent the generation point of the gas and each other end being attached to a separate float adjacent to one another at the surface of the water.

5. In an apparatus for the containment of aqueous pollutants that uses a gas supplying conduit beneath the surface of the water to generate bubbles which rise from an opening in the conduit to the surface of the water to form a bubble barrier and thereby contain the pollutants within a preselected area wherein the improvement comprises:
   a. a mesh material affixed to a point adjacent the generation point of the bubbles from the gas supplying mechanism, the mesh material stretching upwardly from this point towards and having its end terminate adjacent the surface of the water; and
   b. a float which is attached to the end of the mesh material which is adjacent the surface of the water.

6. An apparatus as claimed in claim 5 in which the mesh material is wire screening.

7. An apparatus as claimed in claim 5 which comprises two separate portions of mesh material, each at one end being situated on opposite sides of the gas generation point and each at its other end being joined to a separate float.

8. An apparatus as claimed in claim 7 in which the two floats are held in relative fixed relationship to one another by means of a restraining member.

9. An apparatus as claimed in claim 5 which further comprises a restraining member joined at one of its ends to the float and at its other end to a portion of the gas supplying conduit adjacent the generation point for the bubbles.

* * * * *